ent Office 3,136,778
Patented June 9, 1964

3,136,778
1-[(OMEGA OXY-LOWER ALKYL)]-2-METHYL-3-PHENYL-3-PROPIONYLOXY-PYRROLIDINES
John Frederick Cavalla, Isleworth, Middlesex, and Rupert Aleck Selway, Feltham, Middlesex, England, assignors to Parke, Davis & Company, Detroit, Mich., a corporation of Michigan
No Drawing. Filed Feb. 1, 1962, Ser. No. 170,496
Claims priority, application Great Britain Feb. 27, 1961
5 Claims. (Cl. 260—326.3)

The present invention relates to pyrrolidine compounds. More particularly the invention relates to pyrrolidine compounds of the formula

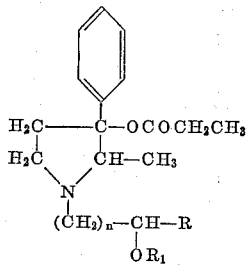

where $n$ is 1 or 2, R is hydrogen, phenyl or phenoxymethyl, and $R_1$ is hydrogen, propionyl, or a $\beta$-hydroxyethyl group.

The free bases of the foregoing formula form acid-addition salts with a variety of organic and inorganic acids. Non-toxic salts are formed by the reaction of the free bases with such acids as hydrochloric, hydrobromic, hydroiodic, sulfuric, acetic, benzoic, benzenesulfonic, citric, maleic, malic, gluconic, ascorbic, tartaric, and related acids. The salt formation is suitably carried out by reacting the selected base with the selected acid in an unreactive solvent. The acid-addition salts can be converted to the free bases by reaction with a base such as sodium carbonate or potassium carbonate. In the applications of this invention the compounds can be employed as free bases or in the form of their acid-addition salts. The acid-addition salts are preferred where greater water solubility is desired.

In accordance with the invention pyrrolidine compounds having the above formula and acid-addition salts thereof can be produced by reacting 2-methyl-3-phenyl-3-propionyloxypyrrolidine with a compound having the formula $$X-(CH_2)_n-CH-R$$
$$\phantom{X-(CH_2)_n-}\overset{|}{O}R_1$$

where X represents a reactive ester group such as a halogen atom or a tosylate or sulfate radical, and $n$, R, and $R_1$ are the same as defined previously. Halogen substituted compounds are preferred. The process is preferably carried out by heating the reactants in an unreactive solvent such as dimethylformamide at 30–200° C. for up to about 24 hours. The pyrrolidine derivative and the halide compound are usually employed in approximately equimolar quantities, although a slight or moderate excess of either can be used. Preferably the reaction is carried out in the presence of an inorganic base such as sodium carbonate, in which case the reaction product can be isolated directly as the free base or converted to an acid-addition salt.

Compounds of the invention can also be produced by reacting 2-methyl-3-phenyl - 3 - propionyloxypyrrolidine with an epoxide having the formula

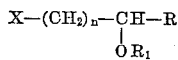

where $n$ and R are the same as defined above. The process is conveniently carried out by heating the reactants either in the absence of a solvent or in an unreactive solvent such as benzene, toluene, dimethylformamide, dioxane, and the like at 15–175° C. for up to about 24 hours. The pyrrolidine derivative and the epoxide compound are usually employed in approximately equimolar quantities although a slight excess of either can be used. Preferably, the reaction is carried out in the absence of a solvent at the reflux temperature of the reaction mixture.

In another method for producing compounds of the invention, the ketone group in a substituted pyrrolidine having in its free base form the formula

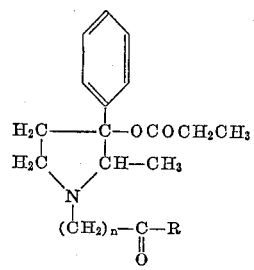

is reduced to a hydroxyl group; where $n$ and R are as defined above. The reduction can be carried out either by catalytic hydrogenation or by mild chemical reducing agents capable of causing reduction of the carbonyl group to a hydroxyl group. When the reduction is carried out by catalytic hydrogenation good results are obtained by using a noble metal catalyst such as palladium on charcoal and by carrying out the hydrogenation at room temperature and atmospheric pressure until approximately the calculated quantity of hydrogen has been absorbed. Higher temperature and pressures can be used but are unnecessary. Preferably the reduction is carried out using a mild chemical reducing agent such as sodium borohydride or potassium borohydride. The reduction can then be carried out in any of the common aqueous or alcoholic solvents such as water, methanol, ethanol, isopropanol, and the like. The substituted pyrrolidines used for the reduction can be prepared by reacting 2-methyl-3-phenyl - 3 - propionyloxypyrrolidine with a keto compound which has a readily displaceable group in either the $\alpha$ or $\beta$ position.

In another method for producing compounds of the invention, a compound having in its free base form the formula

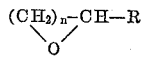

or an acid-addition salt thereof may be reacted with propionic acid or a reactive derivative thereof; where $n$ and R have the same significance as described above and Z represents hydroxy or propionyloxy. When the process is carried out with propionic acid, an esterification catalyst is normally employed and the reactants are heated in an excess of propionic acid or in an unreactive solvent until a satisfactory yield of the desired ester has been obtained. When the process is carried out with a reactive derivative such as propionic anhydride, propionyl chloride or propionyl bromide, the esterification reaction is usually carried out by heating the reactants in the presence of an organic base such as pyridine at 30–150° C., or at the reflux temperature of the mixture, for up to about 24 hours. Satisfactory results can also be obtained somewhat outside of this range. For reasons of economy the use of an excess of the propionic acid or its reactive derivative is preferred. The product is isolated either as the free base or as an acid-addition salt. Compounds which can be used as starting materials in the esterification reaction can be prepared by reacting 2-methyl-3-phenyl-3-propionyloxypyrrolidine with a keto compound which has a readily displaceable group in either the α or β position and reducing the resulting keto-substituted pyrrolidine derivative, either with a mild reducing agent such as potassium borohydride to get the monohydroxy compound, or with a strong reducing agent such as lithium aluminum hydride which will reduce both the keto group and the ester group to give the dihydroxy compound.

Where starting materials for the processes of this invention can exist in asymmetric forms, the methods of the invention are applicable to racemic or to resolved, optically active forms. In those cases where optically active products are desired, they can be obtained either by using optically active starting materials or by resolution of a racemic final product. Resolution can be carried out by fractional crystallization of a salt formed with an optically active acid.

The compounds of the invention are pharmacological agents and are chemical intermediates useful in the preparation of other pyrrolidine derivatives. The compounds of the invention possess a high degree of analgetic activity. They are useful as analgesic agents because they have the ability to relieve severe pain without producing deleterious side effects associated with the use of alkaloidal analgesics. The compounds can be administered either orally or parenterally.

The invention is illustrated but not limited by the following examples:

*Example 1*

To 15.0 g. 2-methyl-3-phenyl-3-propionyloxypyrrolidine hydrochloride in 40 ml. dimethylformamide is added 9.0 g. diethylene glycol chlorohydrin and 6.0 g. sodium carbonate. The resulting mixture is stirred at 100° C. for 17 hours, cooled, and poured into 400 ml. ice water. The aqueous solution is extracted with four 100 ml. portions ethyl ether, the extracts dried over anhydrous sodium sulfate, and concentrated in vacuo to give 1-[2-(2-hydroxyethoxy)-ethyl]-2-methyl-3-phenyl-3-propionyloxypyrrolidine. The corresponding monohydrochloride is prepared by treating the parent base with an ethereal hydrogen chloride solution. The precipitated 1-[2-(2-hydroxyethoxy)-ethyl]-2-methyl-3-phenyl-3-propionyloxypyrrolidine mono-hydrochloride is separated and recrystallized from ethanol/ether; M.P. 139–140° C.

The water soluble hydrobromide is prepared by treating an ether solution of the free base with one equivalent of hydrogen bromide. Removal of the solvent leaves the hydrobromide salt.

In order to prepare the citrate salt, a solution of the free base in isopropyl alcohol is mixed thoroughly with a solution of one equivalent citric acid in isopropyl alcohol. Removal of the solvent under reduced pressure leaves the citrate salt.

*Example 2*

To 6.86 g. 2-methyl-3-phenyl-3-propionyloxypyrrolidine hydrochloride in 40 ml. dimethylformamide is added 3.5 g. sodium carbonate and 2.31 g. ethylene chlorohydrin and the resulting mixture is stirred at 110° C. for 16 hours. The mixture is then cooled, poured into water, the water extracted with five 50 ml. portions ether, the ether extracts dried over anhydrous sodium sulfate and concentrated in vacuo to leave 1-(2-hydroxyethyl)-2-methyl-3-phenyl-3-propionyloxypyrrolidine as an oily residue. Treatment of an ethereal solution of this compound with ethereal hydrogen chloride gives 1-(2-hydroxyethyl)-2-methyl-3-phenyl-3-propionyloxypyrrolidine monohydrochloride which is separated and recrystallized from isopropanol-ether; M.P. 194–196° C.

*Example 3*

2-methyl-3-phenyl-3-propionyloxypyrrolidine hydrochloride, 10.0 g., is dissolved in water and the solution made basic with sodium bicarbonate solution. The free amine thus liberated is extracted with benzene and the benzene removed in vacuo. The base is then treated with 8.0 g. styrene oxide and held at a temperature of 95° C. for 7 hours. The mixture is cooled, dissolved in ether, and treated with ethereal hydrogen chloride to give 1-[(2-hydroxy-2-phenyl)-ethyl]-2-methyl-3-phenyl-3-propionyloxypyrrolidine monohydrochloride which is separated and recrystallized from isopropanol-ether; M.P. 177–179° C. The free base is obtained by treating an aqueous solution of the hydrochloride with a base such as sodium hydroxide or potassium hydroxide.

The water soluble hydrobromide is prepared by treating an ether solution of the free base with one equivalent of hydrogen bromide. Removal of the solvent leaves the hydrobromide salt.

In order to prepare the citrate salt, a solution of the free base in isopropyl alcohol is mixed thoroughly with a solution of one equivalent citric acid in isopropyl alcohol. Removal of the solvent under reduced pressure leaves the citrate salt.

*Example 4*

2-methyl-3-phenyl-3-propionyloxypyrrolidine hydrochloride, 10.0 g., is dissolved in water and made basic using sodium bicarbonate solution. The resulting secondary amine is extracted with benzene, the extracts dried over anhydrous sodium sulfate and concentrated in vacuo, at temperatures below 40° C., to 30 ml. This solution is treated with 8.4 g. glycidyl phenyl ether and the resulting mixture is refluxed for eight hours. The solution is then concentrated, dissolved in ether, and 1-[(2-hydroxy-2-phenoxymethyl)-ethyl]-2-methyl-3-phenyl-3-propionyloxypyrrolidine monohydrochloride is precipitated by the addition of ethereal hydrogen chloride, collected, and recrystallized from ethanol/ether; M.P. 148–150° C. The free base is obtained by treating an aqueous solution of the hydrochloride with a base such as sodium hydroxide or potassium hydroxide.

*Example 5*

1-(2-benzoylethyl)-2-methyl-3-phenyl-3-propionyloxypyrrolidine, 3.65 g., in 100 ml. ethanol is treated with a solution of 0.45 g. potassium borohydride in 20 ml. water and allowed to stand overnight at room temperature. Evaporation of the solution to dryness and treatment of the residue with ice water gives an oil which is extracted with four 25 ml. portions ether. The ether solution is dried over anhydrous sodium sulfate and treated with ethereal hydrogen chloride to give 1-[(3-hydroxy-3-phenyl)-propyl]-2-methyl-3-phenyl-3-propionyloxypyrrolidine monohydrochloride which is separated and recrystallized from isopropanol-ether; M.P. 160–166° C. The free base is obtained by treating an aqueous solution of the hydrochloride with a base such as sodium hydroxide or potassium hydroxide.

The water soluble hydrobromide is prepared by treating an ether solution of the free base with one equivalent of hydrogen bromide. Removal of the solvent leaves the hydrobromide salt.

In order to prepare the citrate salt, a solution of the free base in isopropyl alcohol is mixed thoroughly with a solution of one equivalent citric acid in isopropyl alcohol. Removal of the solvent under reduced pressure leaves the citrate salt.

The 1-(2-benzoylethyl)-2-methyl-3-phenyl-3-propionyloxypyrrolidine used in the above reaction is prepared as follows: 2-methyl-3-phenyl-3-propionyloxypyrrolidine hydrochloride, 15.0 g., is dissolved in water and the solution made basic using sodium bicarbonate solution. The resulting secondary amine is extracted with benzene and the benzene removed in vacuo to give an oil. This oil, in 70 ml. dimethylformamide, is added to a mixture of 19.5 g. (2-benzoylethyl)-trimethyl-ammonium iodide and 6.0 g. sodium carbonate in 40 ml. dimethylformamide and the whole mixture is stirred vigorously for five hours under a stream of nitrogen. The mixture is then poured into water and the solid 1-(2-benzoylethyl)-2-methyl-3-phenyl-3-propionyloxypyrrolidine is collected; M.P. 82–84° C.

Example 6

1-[(3 - hydroxy-3-phenyl)-propyl]-2-phenyl-3-pyrrolidinol, 4.8 g., is treated with 40 ml. propionic anhydride and 10 ml. pyridine at 110° C. for 16 hours. The unreacted reagents are removed by vacuum distillation and the remaining oily 1-[(3-phenyl-3-propionyloxy)-propyl]-2-methyl-3-phenyl-3-propionyloxypyrrolidine is dissolved in ether and added to an ether solution containing one equivalent of tartaric acid. Removal of the solvent leaves the monotartrate salt of 1-[(3-phenyl-3-propionyloxy)-propyl]-2-methyl-3-phenyl - 3 - propionyloxypyrrolidine; M.P. 116–121° C. after recrystallization from isopropanol-ether. Conversion to the hydrochloride salt is accomplished by treating an ether solution of the free base with one equivalent of hydrogen chloride. Removal of the solvent leaves the monohydrochloride salt.

The water soluble hydrobromide is prepared by treating an ether solution of the free base with one equivalent of hydrogen bromide. Removal of the solvent leaves the hydrobromide salt.

In order to prepare the citrate salt, a solution of the free base in isopropyl alcohol is mixed thoroughly with a solution of one equivalent citric acid in isopropyl alcohol. Removal of the solvent under reduced pressure leaves the citrate salt. The 1-[(3-hydroxy-3-phenyl)-propyl]-2-methyl - 3 - phenyl-3-pyrrolidinol used in the above reaction is prepared as follows: 2-methyl-3-phenyl-3-propionyloxypyrrolidine hydrochloride, 15.0 g., is dissolved in water and the solution made basic using sodium bicarbonate solution. The resulting secondary amine is extracted with benzene and the benzene removed in vacuo to give an oil. This oil, in 70 ml. dimethylformamide, is added to a mixture of 19.5 g. (2-benzoylethyl)-trimethylammonium iodide and 6.0 g. sodium carbonate in 40 ml. dimethylformamide and the whole mixture is stirred vigorously for five hours under a stream of nitrogen. The mixture is then poured into water and the solid 1-(2-benzoylethyl)-2-methyl-3-phenyl-3-propionyloxypyrrolidine is collected; M.P. 82–84° C. 1-(2-benzoylethyl) - 2 - methyl - 3 - phenyl-3-propionyloxypyrrolidine, 10.0 g. in 100 ml. dry ether, is added to a stirred slurry of 5.0 g. lithium aluminum hydride in 150 ml. dry ether and the mixture is refluxed with stirring for three hours. The suspension is cooled, treated cautiously with 20 ml. water, filtered, and concentrated to an oil which upon crystallization from benzene-petroleum ether gives 1 - [(3 - hydroxy - 3 - phenyl) - propyl] - 2 - methyl - 3-phenyl-3-pyrrolidinol; M.P. 107–110° C.

We claim:
1. A member of the class consisting of compounds of the formula

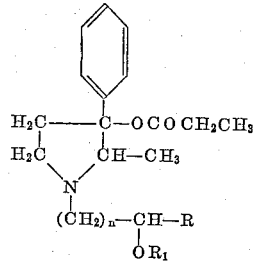

and non-toxic acid-addition salts thereof; where $n$ is a positive integer less than 3, R is a member of the class consisting of hydrogen, phenyl, and phenoxymethyl, and $R_1$ is a member of the class consisting of hydrogen, propionyl, and β-hydroxyethyl.

2. 1 - [(3 - hydroxy - 3 - phenyl) - propyl] - 2 methyl-3-phenyl-3-propionyloxypyrrolidine.

3. 1 - [(3 - hydroxy - 3 - phenyl) - propyl] - 2 - methyl-3-phenyl-3-propionyloxypyrrolidine monohydrochloride.

4. 1 - [2 - (2 - hydroxyethoxy) - ethyl] - 2 - methyl - 3-phenyl-3-propionyloxypyrrolidine monohydrochloride.

5. 1 - [(3 - phenyl - 3 - propionloxy) - propyl] - 2 methyl-3-phenyl-3-propionyloxypyrrolidine monotartrate.

References Cited in the file of this patent
UNITED STATES PATENTS
2,904,550     Pohland _____ Sept. 15, 1959